United States Patent
Takeuchi

(10) Patent No.: US 7,315,163 B2
(45) Date of Patent: Jan. 1, 2008

(54) ARITHMETIC UNIT

(75) Inventor: Daisuke Takeuchi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 158 days.

(21) Appl. No.: 11/354,888

(22) Filed: Feb. 16, 2006

(65) Prior Publication Data
US 2006/0184604 A1 Aug. 17, 2006

(30) Foreign Application Priority Data
Feb. 17, 2005 (JP) ............................. 2005-041340

(51) Int. Cl.
G01R 31/28 (2006.01)
G06F 17/52 (2006.01)

(52) U.S. Cl. .................... 324/158.1; 708/625

(58) Field of Classification Search ............ 324/158.1, 324/765; 708/620, 625, 495, 524, 700, 523, 708/550; 712/222, 204, 32, 208, 10
See application file for complete search history.

(56) References Cited

U.S. PATENT DOCUMENTS

| | | | | |
|---|---|---|---|---|
| 5,448,509 A | * | 9/1995 | Lee et al. ................... | 708/530 |
| 6,148,319 A | * | 11/2000 | Ozaki ......................... | 708/625 |
| 6,233,597 B1 | * | 5/2001 | Tanoue et al. .............. | 708/625 |
| 2003/0229659 A1 | | 12/2003 | Halahmi et al. | |

FOREIGN PATENT DOCUMENTS

JP 1-267728 A 10/1989

* cited by examiner

*Primary Examiner*—Ha Tran Nguyen
*Assistant Examiner*—Tung X. Nguyen
(74) *Attorney, Agent, or Firm*—McDermott Will & Emery LLP

(57) ABSTRACT

In order to correct an overflow of a multiplication result while improving the operation speed, an overflow detection unit detects an overflow based on whether a multiplicand A and a multiplier B are both a negative value with the largest absolute value. A carry-save adder adds together in carry-save addition partial products and $-1$ (where all bits are 1) as a first correction value to output an intermediate sum and an intermediate carry corresponding to $A \times B - 1$. A carry-propagate adder adds together in carry-propagate addition the intermediate sum, the intermediate carry and a second correction value to output the multiplication result. Where there is no overflow, the second correction value becomes 1 to cancel out the first correction value, whereby the operation result is $A \times B$. Where there is an overflow, the second correction value becomes 0, whereby the operation result is $A \times B - 1$ in which the overflow is corrected by the first correction value.

18 Claims, 17 Drawing Sheets

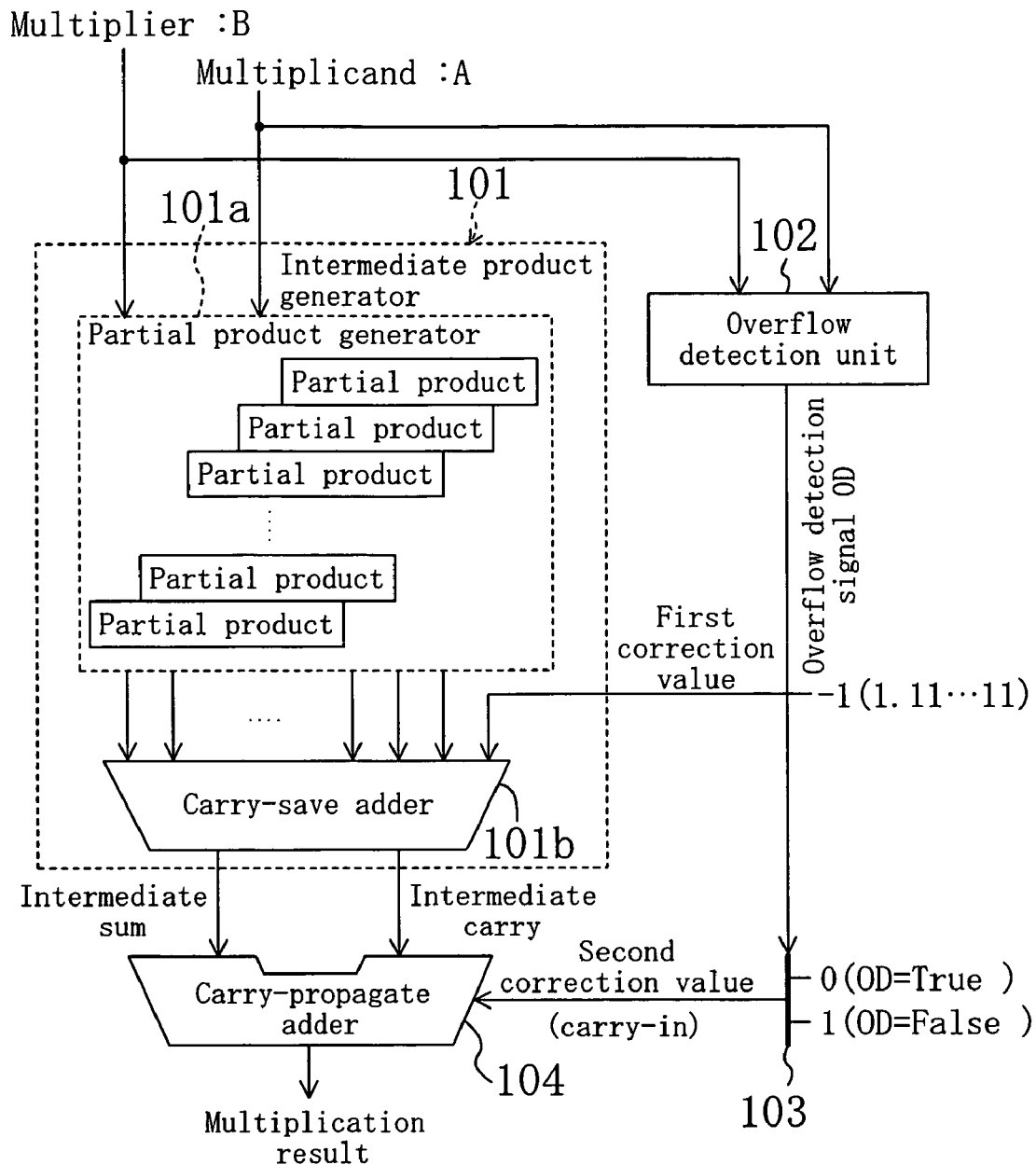

FIG. 2

(Multiplier)

```
                    1. 0 0 0 0 0 0     Multiplicand A
              ×     1. 0 0 0 0 0 0     Multiplier B
    +   1. 1 1 1 1 1 1 1 1 1 1 1 1     First correction value (-1)
    ─────────────────────────────
                      0 0 0 0 0 0 0
                    0 0 0 0 0 0 0
                  0 0 0 0 0 0 0
                0 0 0 0 0 0 0
              0 0 0 0 0 0 0
            0 0 0 0 0 0 0
          1 0 0 0 0 0 0
    +   1 1 1 1 1 1 1 1 1 1 1 1
    ─────────────────────────────
          0. 1 1 1 1 1 1 1 1 1 1 1 1   Intermediate sum
       (1)0. 0 0 0 0 0 0 0 0 0 0 0 0   Intermediate carry ↓                      <Carry-propagate addition;
                                        second correction value is also added >

0. 1 1 1 1 1 1 1 1 1 1 1 1   Intermediate sum
          0. 0 0 0 0 0 0 0 0 0 0 0 0   Intermediate carry
    +                           0      Second correction value
    ─────────────────────────────       (OD=True→0, OD=False→1)
          0. 1 1 1 1 1 1 1 1 1 1 1 1   Product (=largest positive value)
```

FIG. 4

(Multiply-add operation with overflow)

```
              1. 0 0 0 0 0 0        Multiplicand A
           ×  1. 0 0 0 0 0 0        Multiplier B
       +   1. 1 1 1 1 1 1 1 1 1 1 1 1    First correction value (−1)
       ─────────────────────────
                  0 0 0 0 0 0 0
                0 0 0 0 0 0 0
              0 0 0 0 0 0 0
            0 0 0 0 0 0 0
          0 0 0 0 0 0 0
        0 0 0 0 0 0 0
        1 0 0 0 0 0 0
       +1 1 1 1 1 1 1 1 1 1 1 1
       ─────────────────────────
           0. 1 1 1 1 1 1 1 1 1 1 1 1   First intermediate sum
        (1)0. 0 0 0 0 0 0 0 0 0 0 0 0   First intermediate carry
```

↓  ⟨Shift operation⟩

```
   0. 1 1 1 1 1 1 1 1 1 1 1 1[1]   Shifted intermediate sum
                                   (always filled with 1)
   0. 0 0 0 0 0 0 0 0 0 0 0 0[0]   Shifted intermediate carry
                                   (always filled with 0)
```

↓  ⟨Carry-save addition of addend X⟩

```
     0. 1 1 1 1 1 1 1 1 1 1 1 1
     0. 0 0 0 0 0 0 0 0 0 0 0 0
   + x. x x x x x x x x x x x x    Addend X
   ─────────────────────────
     y. y y y y y y y y y y y y    Second intermediate sum
     z. z z z z z z z z z z z z    Second intermediate carry
```

↓  ⟨Carry-propagate addition; second
    correction value is also added⟩

```
     y. y y y y y y y y y y y y
     z. z z z z z z z z z z z z
   +                         0     Second correction value
   ─────────────────────────        (OD=True→0, OD=False→1)
     w. w w w w w w w w w w w w    Multiply-add result
   (=x. x x x x x x x x x x x x    =Addend X
   +0. 1 1 1 1 1 1 1 1 1 1 1 1     +Product (=largest positive value))
```

FIG. 6

(Multiply-add operation with overflow)

```
              1. 0 0 0 0 0 0        Multiplicand A
           ×  1. 0 0 0 0 0 0        Multiplier B
   +     1. 1 1 1 1 1 1 1 1 1 1 1 1 First correction value
   ──────────────────────           (−1 in multiply-add operation)
                 0 0 0 0 0 0 0
               0 0 0 0 0 0 0
             0 0 0 0 0 0 0
           0 0 0 0 0 0 0
         0 0 0 0 0 0 0
       0 0 0 0 0 0 0
     1 0 0 0 0 0 0
   + 1 1 1 1 1 1 1 1 1 1 1 1
   ──────────────────────
       0. 1 1 1 1 1 1 1 1 1 1 1 1   First intermediate sum
     (1)0. 0 0 0 0 0 0 0 0 0 0 0 0   First intermediate carry
```

↓      <Shift operation>
           Shifted intermediate sum

```
   0. 1 1 1 1 1 1 1 1 1 1 1 1 1[1]    (filled with 1 in multiply-add operation)
   0. 0 0 0 0 0 0 0 0 0 0 0 0 0[0]  Shifted intermediate carry
                                       (always filled with 0)
```

↓      <Carry-save addition of addend X>

```
     0. 1 1 1 1 1 1 1 1 1 1 1 1 1
     0. 0 0 0 0 0 0 0 0 0 0 0 0 0
   + x. x x x x x x x x x x x x x    Addend X
   ──────────────────────
     y. y y y y y y y y y y y y y    Second intermediate sum
     z. z z z z z z z z z z z z z    Second intermediate carry
```

↓      <Carry-propagate addition;
           second correction value is also added >

```
     y. y y y y y y y y y y y y y
     z. z z z z z z z z z z z z z    Second correction value
   +                           0       (0 if OD=true and 1 if
   ──────────────────────              OD=false in multiply-add operation)
     w. w w w w w w w w w w w w w    Multiply-add result
   (=x. x x x x x x x x x x x x x    =Addend X
    +0. 1 1 1 1 1 1 1 1 1 1 1 1 1     +Product (=largest positive value))
```

FIG. 7

(Multiply-subtract operation with overflow)

```
                    1. 0 0 0 0 0 0          Multiplicand A
                  × 1. 0 0 0 0 0 0          Multiplier B
   +  0. 0 0 0 0 0 0 0 0 0 0 0 0            First correction value
      ─────────────────────                   (0 in multiply-subtract operation)
                    0 0 0 0 0 0 0
                  0 0 0 0 0 0 0
                0 0 0 0 0 0 0
              0 0 0 0 0 0 0
            0 0 0 0 0 0 0
          0 0 0 0 0 0 0
        1 0 0 0 0 0 0
   +  0 0 0 0 0 0 0 0 0 0 0 0 0
      ─────────────────────
         1. 0 0 0 0 0 0 0 0 0 0 0 0         First intermediate sum
         0. 0 0 0 0 0 0 0 0 0 0 0 0         First intermediate carry ↓                         <Shift operation>
                                            Shifted intermediate sum
      1. 0 0 0 0 0 0 0 0 0 0 0 0 0[0]         (filled with 0 in multiply-subtract operation)
      0. 0 0 0 0 0 0 0 0 0 0 0 0 0[0]       Shifted intermediate carry
                                              (always filled with 0)
                  ↓          <Two's complement conversion; carry-save addition of addend X>
                                            (Values before and after two's complemement conversion
      1. 0 0 0 0 0 0 0 0 0 0 0 0 0           are the same when overflow occurs)
      0. 0 0 0 0 0 0 0 0 0 0 0 0 0
   +  x. x x x x x x x x x x x x x         Addend X
      ─────────────────────
      y. y y y y y y y y y y y y y         Second intermediate sum
      z. z z z z z z z z z z z z z         Second intermediate carry ↓                         <Carry-propagate addition;
                                             second correction value is also added> y. y y y y y y y y y y y y y
      z. z z z z z z z z z z z z z         Second correction value (1 if OD=true and 0
   +                            1           if OD=false in multiply-subtract operation)
      ─────────────────────
      w. w w w w w w w w w w w w w         Multiply-subtract result
    (=x. x x x x x x x x x x x x x         =Addend X
     +1. 0 0 0 0 0 0 0 0 0 0 0 0 1          +Two's complement of product(=largest
                                                                positive value))
```

FIG. 9

(Multiply-add operation with overflow)

```
              1. 0 0 0 0 0 0          Multiplicand A
         ×    1. 0 0 0 0 0 0          Multiplier B
   +    1.1 1 1 1 1 1 1 1 1 1 1 1     First correction value
   ─────────────────────────────         (always −1, even with shift operation
              0 0 0 0 0 0 0              taken into consideration)
            0 0 0 0 0 0 0
          0 0 0 0 0 0 0
        0 0 0 0 0 0 0
      0 0 0 0 0 0 0
    0 0 0 0 0 0 0
  1 0 0 0 0 0 0
+ 1 1 1 1 1 1 1 1 1 1 1 1
───────────────────────────
      0. 1 1 1 1 1 1 1 1 1 1 1 1      First intermediate sum
   (1)0. 0 0 0 0 0 0 0 0 0 0 0 0      First intermediate carry ↓                      <Shift operation>
                                      Shifted intermediate sum
      0. 1 1 1 1 1 1 1 1 1 1 1 1[1]     (filled with 1 in multiply-add operation)
      0. 0 0 0 0 0 0 0 0 0 0 0 0[0]   Shifted intermediate carry
                                         (always filled with 0)

↓                      <Carry-save addition of addend X,
                                      third correction value>

0. 1 1 1 1 1 1 1 1 1 1 1 1
      0. 0 0 0 0 0 0 0 0 0 0 0 0
   +  x. x x x x x x x x x x x x     Addend X
   +                        0         Third correction value
   ─────────────────────────────         (0 in multiply-add operation)
      y. y y y y y y y y y y y y      Second intermediate sum
      z. z z z z z z z z z z z z      Second intermediate carry ↓                      <Carry-propagate addition; second
                                      correction value is also added> y. y y y y y y y y y y y y
      z. z z z z z z z z z z z z      Second correction value (0 if OD=true and
   +                        0          1 if OD=false in multiply-add operation)
   ─────────────────────────────
      w. w w w w w w w w w w w w      Multiply-add result
   (= x. x x x x x x x x x x x x      =Addend X
    +0. 1 1 1 1 1 1 1 1 1 1 1 1         +Product (=largest positive value))
```

FIG. 10

(Multiply-subtract operation with overflow)

```
              1. 0 0 0 0 0 0          Multiplicand A
            × 1. 0 0 0 0 0 0          Multiplier B
    +   1. 1 1 1 1 1 1 1 1 1 1 1 1    First correction value (always -1; -10 with
    ────────────────────────────      shift operation taken into consideration;
                   0 0 0 0 0 0 0      +10 with subtraction for multiply-subtract
                 0 0 0 0 0 0 0        operation taken into consideration)
               0 0 0 0 0 0 0
             0 0 0 0 0 0 0
           0 0 0 0 0 0 0
         0 0 0 0 0 0 0
       1 0 0 0 0 0 0
    + 1 1 1 1 1 1 1 1 1 1 1 1 1
    ────────────────────────────
        0. 1 1 1 1 1 1 1 1 1 1 1 1    First intermediate sum
        0. 0 0 0 0 0 0 0 0 0 0 0 0    First intermediate carry ↓                 <Shift operation>
                                      Shifted intermediate sum
        0. 1 1 1 1 1 1 1 1 1 1 1 1[0]   (filled with 0 in multiply-subtract operation)
        0. 0 0 0 0 0 0 0 0 0 0 0 0[0] Shifted intermediate carry
                                        (always filled with 0)
                    ↓                 <Inversion; carry-save addition of addend X,
                                       third correction value>
        1. 0 0 0 0 0 0 0 0 0 0 0 1    Shifted and inverted intermediate sum(×(-1)-1)
        1. 1 1 1 1 1 1 1 1 1 1 1 1    Shifted and inverted intermediate carry(×(-1)-10)
    +   x. x x x x x x x x x x x x    Addend X
    +                           1     Third correction value
    ────────────────────────────       (1 in multiply-subtract operation)
        y. y y y y y y y y y y y y    Second intermediate sum
        z. z z z z z z z z z z z z    Second intermediate carry ↓                 <Carry-propagate addition;
                                       second correction value is also added> y. y y y y y y y y y y y y
        z. z z z z z z z z z z z z    Second correction value (1 if OD=true and 0
    +                           1      if OD=false in multiply-subtract operation)
    ────────────────────────────
        w. w w w w w w w w w w w w    Multiply-subtract result
      (=x. x x x x x x x x x x x x    =Addend X
       +1. 0 0 0 0 0 0 0 0 0 0 0 1    +Two's complement of product(=largest
                                                             positive value))
```

FIG. 12

(Multiply-add operation with overflow)

```
                 1. 0 0 0 0 0 0      Multiplicand A
                                     Booth-encoded multiplier B
         ×           1̄ 0 0 0         (where 1̄ represents -1)
  +  1 1. 1 1 1 1 1 1 1 1 1 1 1     First correction value
  _____      (-1 in multiply-add operation)
                 0 0 0 0 0 0 0 0
               0 0 0 0 0 0 0 0
             0 0 0 0 0 0 0 0
           0 0 1 1 1 1 1 1
                     1  0  0  0      Two's complement correction term for
                                     partial products
  +  1 1 1 1 1 1 1 1 1 1 1 1 1 1
  _____
     0 0. 1 1 1 1 1 1 1 1 1 1 1 1    First intermediate sum
  (1)0 0. 0 0 0 0 0 0 0 0 0 0 0 0    First intermediate carry ↓                   <Shift operation>

Shifted intermediate sum
     0. 1 1 1 1 1 1 1 1 1 1 1 1[1]      (filled with 1 in multiply-add operation)
     0. 0 0 0 0 0 0 0 0 0 0 0 0[0]   Shifted intermediate carry
                                        (always filled with 0)

↓                   <Carry-save addition of addend X>

0. 1 1 1 1 1 1 1 1 1 1 1 1
     0. 0 0 0 0 0 0 0 0 0 0 0 0
  +  x. x x x x x x x x x x x x     Addend X
  _____ y. y y y y y y y y y y y y     Second intermediate sum
     z. z z z z z z z z z z z z     Second intermediate carry ↓                   <Carry-propagate addition;
                                        second correction value is also added> y. y y y y y y y y y y y y
     z. z z z z z z z z z z z z     Second correction value (0 if OD=true and 1
  +                          0         if OD=false in multiply-add operation)
  _____ w. w w w w w w w w w w w w     Multiply-add result
  (= x. x x x x x x x x x x x x     = Addend X
   + 0. 1 1 1 1 1 1 1 1 1 1 1 1       + Product (=largest positive value))
```

FIG. 13

(Multiply-subtract operation with overflow )

```
                1. 0 0 0 0 0 0      Multiplicand A
          ×             1 0 0 0     Booth-encoded multiplier B
+    0. 0 0 0 0 0 0 0 0 0 0 0 0     First correction value
  _____              (0 in multiply-subtract operation)
             0 0 0 0 0 0 0 0
           0 0 0 0 0 0 0 0
         0 0 0 0 0 0 0 0
       1 1 0 0 0 0 0 0
                       0  0  0  0   Two's complement correction term for
+    0 0 0 0 0 0 0 0 0 0 0 0 0       partial products
  _____
     1 1. 0 0 0 0 0 0 0 0 0 0 0 0   First intermediate sum
  (0)0 0. 0 0 0 0 0 0 0 0 0 0 0 0   First intermediate carry ↓                     <Shift operation>
                                    Shifted intermediate sum
     1. 0 0 0 0 0 0 0 0 0 0 0 0[0]    (filled with 0 in multiply-subtract operation)
     0. 0 0 0 0 0 0 0 0 0 0 0 0[0]  Shifted intermediate carry
                                      (always filled with 0)

↓                     <Carry-save addition of addend X>

1. 0 0 0 0 0 0 0 0 0 0 0 0
     0. 0 0 0 0 0 0 0 0 0 0 0 0
+    x. x x x x x x x x x x x x     Addend X
  _____
     y. y y y y y y y y y y y y     Second intermediate sum
     z. z z z z z z z z z z z z     Second intermediate carry ↓                     <Carry-propagate addition;
                                     second correction value is also added> y. y y y y y y y y y y y y
     z. z z z z z z z z z z z z
+                              1    Second correction value (1 if OD=true and 0
  _____              if OD=false in multiply-subtract operation)
     w. w w w w w w w w w w w w     Multiply-subtract result
  (= x. x x x x x x x x x x x x     =Addend X
   + 1. 0 0 0 0 0 0 0 0 0 0 0 1      +Two's complement of product (=largest
                                                           positive value))
```

FIG. 15

(Multiply-add operation with overflow)

```
                1. 0 0 0 0 0 0          Multiplicand A
                          _                 Booth-encoded multiplier B (where 1̄
         ×              1 0 0 0              represents -1)
   +  1 1. 1 1 1 1 1 1 1 1 1 1 1 1     First correction value (always -1)
   ─────────────────────────────────
                  0 0 0 0 0 0 0 0
                0 0 0 0 0 0 0 0
              0 0 0 0 0 0 0 0
          0 0 1 1 1 1 1 1                  Two's complement correction term for
                      1 0 0 0                partial products
   +  1 1 1 1 1 1 1 1 1 1 1 1 1 1
   ─────────────────────────────────
         0 0. 1 1 1 1 1 1 1 1 1 1 1 1    First intermediate sum
     (1) 0 0. 0 0 0 0 0 0 0 0 0 0 0 0    First intermediate carry ↓                 <Shift operation>

0. 1 1 1 1 1 1 1 1 1 1 1 1[1]    Shifted intermediate sum (always filled with 1)
       0. 0 0 0 0 0 0 0 0 0 0 0 0[0]    Shifted intermediate carry (always filled with 0)

↓                 <Carry-save addition of addend X >

0. 1 1 1 1 1 1 1 1 1 1 1 1
       0. 0 0 0 0 0 0 0 0 0 0 0 0        Third correction value
                                    0      (0 in multiply-add operation)
   +   x. x x x x x x x x x x x x        Addend X
   ─────────────────────────────────
       y. y y y y y y y y y y y y         Second intermediate sum
       z. z z z z z z z z z z z z         Second intermediate carry ↓                 <Carry-propagate addition;
                                         second correction value is also added> y. y y y y y y y y y y y y
       z. z z z z z z z z z z z z         Second correction value (0 if OD=true and 1
   +                             0         if OD=false in multiply-add operation)
   ─────────────────────────────────
       w. w w w w w w w w w w w w         Multiply-add result
    (= x. x x x x x x x x x x x x         =Addend X
      + 0. 1 1 1 1 1 1 1 1 1 1 1 1         +Product (=largest positive value))
```

FIG. 16

(Multiply-subtract operation with overflow)

```
              1.0 0 0 0 0 0          Multiplicand A
         ×           1 0 0 0         Booth-encoded multiplier B
+  1 1.1 1 1 1 1 1 1 1 1 1 1 1       First correction value (always -1)
----------------------------
              0 0 0 0 0 0 0 0
            0 0 0 0 0 0 0 0
          0 0 0 0 0 0 0 0
        1 1 0 0 0 0 0 0
                    0   0   0   0    Two's complement correction term for
+  1 1 1 1 1 1 1 1 1 1 1 1 1 1          partial products
----------------------------
   0 0.1 1 1 1 1 1 1 1 1 1 1 1       First intermediate sum
(1)1 0.0 0 0 0 0 0 0 0 0 0 0 0       First intermediate carry ↓                      <Shift operation>

0.1 1 1 1 1 1 1 1 1 1 1 1 1[1]    Shifted intermediate sum (always filled with 1)
   0.0 0 0 0 0 0 0 0 0 0 0 0 0[0]    Shifted intermediate carry (always filled with 0)

↓                      <Carry-save addition of addend X>

0.1 1 1 1 1 1 1 1 1 1 1 1 1
   0.0 0 0 0 0 0 0 0 0 0 0 0 0       Third correction value
                               1        (1 in multiply-subtract operation)
+  x.x x x x x x x x x x x x x       Addend X
----------------------------
   y.y y y y y y y y y y y y y       Second intermediate sum
   z.z z z z z z z z z z z z z       Second intermediate carry ↓                      <Carry-propagate addition;
                                      second correction value is also added> y.y y y y y y y y y y y y y
   z.z z z z z z z z z z z z z       Second correction value (1 if OD=true and 0
+                              1       if OD=false in multiply-subtract operation)
----------------------------
   w.w w w w w w w w w w w w w       Multiply-subtract result
  (=x.x x x x x x x x x x x x x      =Addend X
  +1.0 0 0 0 0 0 0 0 0 0 0 0 1       +Two's complement of product (=largest
                                                              positive value))
```

ARITHMETIC UNIT

BACKGROUND OF THE INVENTION

1. Field of the Invention

The present invention relates to an arithmetic unit for performing arithmetic operations such as a multiplication operation, a multiply-add operation and a multiply-subtract operation on fixed-point numbers.

2. Description of the Background Art

It has become common to provide, as an on-chip component, an arithmetic unit such as a multiplier unit, a multiply-add unit, etc., in an LSI for digitally processing sound data, multimedia data, and the like. For processes for which high-precision operations are required, an arithmetic unit of this type performs operations with fixed-point numbers represented as two's complements. In such operations on fixed-point numbers, it is required to perform a saturation operation when a multiplication result overflows. Specifically, an n-bit fixed-point number can take values in the range of $-2^n$ to $+2^n-1$ (or 100 . . . 00 to 011 . . . 11 in binary representation), and a multiplication result will overflow (i.e., exceed the range of positive values that can be properly represented) if the multiplicand and the multiplier are both the smallest value (a negative value with the largest absolute value). Therefore, a saturation operation is performed so as to correct the multiplication result to the largest positive representable value.

As shown in FIG. 17, for example, a conventional unit capable of such a saturation operation includes a partial product generator 901 for producing a plurality of partial products of a multiplicand A and a multiplier B, an adder 902 for adding together the produced partial products, an overflow detection unit 903 for detecting the presence/absence of an overflow, and a selector 904 for selectively outputting either the addition result from the adder 902 or the saturated value (largest positive value) according to the presence/absence of an overflow. Therefore, if an overflow occurs (i.e., if the multiplicand A and the multiplier B are both the negative value with the largest absolute value), the saturated value is selected, thus correcting the multiplication result.

However, in a case where the selection between the output from the adder 902 and the saturated value is made by the selector 904, a multiplication result that does not overflow is obtained only after the delay through the selector 904 since when it is output from the adder 902.

In view of this, there have been proposed arithmetic units employing the Booth's algorithm, in which if an overflow occurs, a Booth encoder outputs a predetermined value on which a multiplication operation is performed to give the saturated value (see, for example, Japanese Laid-Open Patent Publication No. 1-267728).

However, such a method can only be applicable to arithmetic units including a Booth encoder. Moreover, even with such a Booth encoder, it is not always easy to actually improve the operation speed. That is, where the Booth encoder is controlled based on the presence/absence of an overflow, the amount of time required for the overflow detection operation adds to the total operation time. Therefore, even though there is no delay due to a selector, the total operation time is increased by the amount of time required for the overflow detection operation, whereby the operation speed may not always be improved.

SUMMARY OF THE INVENTION

It is therefore an object of the present invention to improve the speed of an arithmetic operation, including multiplication while appropriately correcting an overflow in the multiplication result.

In order to achieve the object set forth above, an arithmetic unit of the present invention is an arithmetic unit for performing arithmetic operations including a multiplication operation between a multiplicand A and a multiplier B, each being a fixed-point number represented as a two's complement, the arithmetic unit including:

an overflow detection unit for detecting presence/absence of an overflow in a product between the multiplicand A and the multiplier B;

an intermediate product generator for obtaining an intermediate sum and an intermediate carry by adding together in carry-save addition a plurality of partial products of the multiplicand A and the multiplier B and a predetermined first correction value (e.g., −1); and a carry-propagate adder for obtaining an operation result by adding together in carry-propagate addition the intermediate sum and the intermediate carry, wherein a predetermined second correction value according to a detection result of the overflow detection unit (e.g., 0 where an overflow occurs and 1 where an overflow does not occur) is added either in the intermediate product generator or the carry-propagate adder.

The overflow detection unit detects an overflow when the multiplicand A and the multiplier B are both a negative value with a largest absolute value.

The intermediate product generator is configured so that the plurality of partial products and the first correction value are added together in carry-save addition with a parallel tree architecture.

Thus, for example, the first correction value where all bits are 1 can be added in carry-save addition as the correction value for correcting an overflow irrespective of occurrence or nonoccurrence of an overflow, whereby it is possible to avoid a delay caused by constraint of the overflow detection timing and a delay due to carry propagation. Moreover, a 1-bit second correction value being either 1 or 0 according to occurrence or nonoccurrence of an overflow, for example, can be added, whereby it is possible to cancel out or not to cancel out the correction by the first correction value with little or no delay. Furthermore, the addition of the second correction value may be performed in a later stage in the arithmetic operation, thereby increasing the margin for the overflow detection timing. Thus, it is possible to easily improve the operation speed of arithmetic operations including multiplication while appropriately correcting an overflow.

The configuration as described above can be applicable to an arithmetic unit for obtaining a multiply-add result with an addend X, in addition to obtaining a product. Specifically, partial products, the first correction value and the addend may be added together in carry-save addition, or an intermediate sum, an intermediate carry and the addend may be added together in carry-save addition wherein the intermediate sum and the intermediate carry are obtained by adding together the partial products and the first correction value. In this case, the intermediate sum and the intermediate carry may be shifted (bit extension) so that the number of bits of the operation result is equal to the sum of the number of bits of the multiplicand and that of the multiplier, wherein the least significant bit may be filled with 1, for example, thereby appropriately performing an operation equivalent to adding/subtracting a predetermined correction value.

Moreover, there may be provided an arithmetic unit for selectively obtaining a multiply-add result or a multiply-subtract result with the addend X according to an operation selection signal, or the like. Specifically, the intermediate sum and the intermediate carry, which are obtained by adding together in carry-save addition the partial products and the first correction value, may be subjected to two's complement conversion or bit inversion and addition with a predetermined correction value, and then added with the addend, thereby obtaining a multiply-subtract result. In this case, based on whether the operation is a multiply-add operation or a multiply-subtract operation, for example, bit inversion may be controlled, and also the first correction value may be switched or the third correction value may be switched while the first correction value is fixed, so as to obtain a value obtained by subtracting the intermediate sum and the intermediate carry from the addend.

Moreover, the configuration as described above can be applicable to an arithmetic unit using the Booth's algorithm. Specifically, a multiplier encoding unit may be used to encode the multiplier or the multiplier multiplied by −1 depending on whether the operation is a multiply-add operation or a multiply-subtract operation, whereby it is possible to obtain a multiply-add result or a multiply-subtract result, and it is possible to quickly obtain an overflow-corrected operation result.

BRIEF DESCRIPTION OF THE DRAWINGS

FIG. 1 is a block diagram showing a configuration of an arithmetic unit according to Embodiment 1.

FIG. 2 shows an exemplary multiplication operation when an overflow occurs according to Embodiment 1.

FIG. 4 shows an exemplary multiply-add operation when an overflow occurs according to Embodiment 2.

FIG. 6 shows an exemplary multiply-add operation when an overflow occurs according to Embodiment 3.

FIG. 7 shows an exemplary multiply-subtract operation when an overflow occurs according to Embodiment 3.

FIG. 9 shows an exemplary multiply-add operation when an overflow occurs according to Embodiment 4.

FIG. 10 shows an exemplary multiply-subtract operation when an overflow occurs according to Embodiment 4.

FIG. 12 shows an exemplary multiply-add operation when an overflow occurs according to Embodiment 5.

FIG. 13 shows an exemplary multiply-subtract operation when an overflow occurs according to Embodiment 5.

FIG. 15 shows an exemplary multiply-add operation when an overflow occurs according to Embodiment 6.

FIG. 16 shows an exemplary multiply-subtract operation when an overflow occurs according to Embodiment 6.

DETAILED DESCRIPTION OF THE PREFERRED EMBODIMENTS

Figure 3:
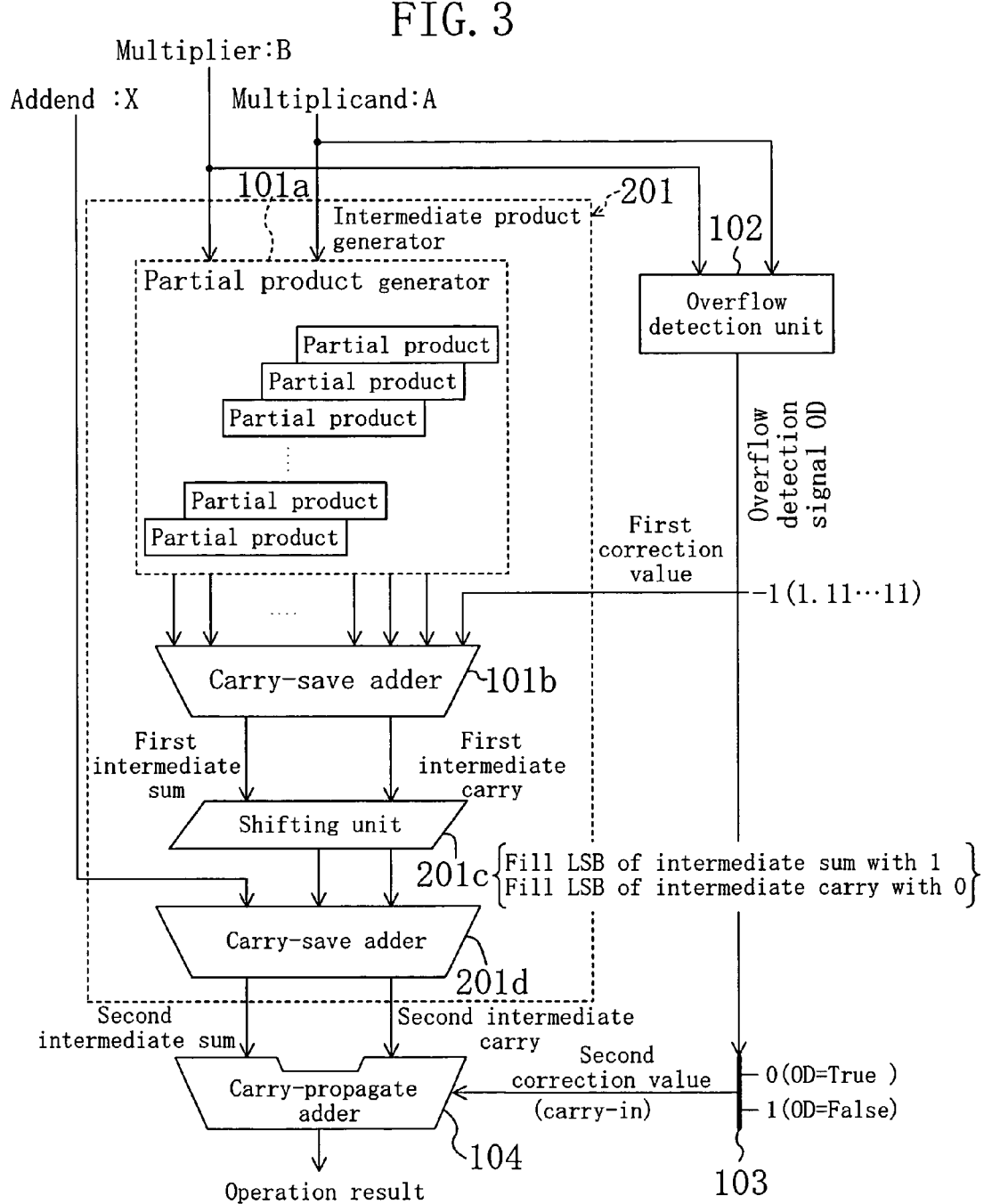
FIG. 3 is a block diagram showing a configuration of an arithmetic unit according to Embodiment 2.

Preferred embodiments of the present invention will now be described with reference to the drawings. Note that in each of the following embodiments, like elements to those of any preceding embodiments will be denoted by like reference numerals, and will not be described repeatedly.

Embodiment 1

Embodiment 1 of the present invention is directed to an arithmetic unit for obtaining a product between a multiplicand A and a multiplier B. Referring to FIG. 1, the arithmetic unit includes an intermediate product generator 101, an overflow detection unit 102, a selector 103, and a carry-propagate adder 104.

The intermediate product generator 101 includes a partial product generator 101a for generating a plurality of partial products, and a carry-save adder 101b for carry-save addition of the plurality of partial products and −1 (a value where all bits are 1) as a first correction value. Thus, the intermediate product generator 101 outputs the intermediate sum and the intermediate carry for A×B−1. Note that the intermediate product generator 101 may be a unit that employs the Booth's algorithm or a unit that adds together the partial products of each bit of a multiplier. Although the present invention is not limited to this, if the plurality of partial products and the first correction value are added in parallel by a carry-save adder tree, it is in many cases possible to more easily improve the operation speed by avoiding an increase in the number of logic gates provided for adding the first correction value.

The overflow detection unit 102 detects an overflow to thereby assert an overflow detection signal OD if the multiplicand A and the multiplier B are both a negative value with the largest absolute value.

The selector 103 selectively outputs, as a second correction value, 0 when the overflow detection signal OD is asserted and 1 when it is not asserted, and the second correction value is input as a carry-in to the LSB (least significant bit) of the carry-propagate adder 104.

The carry-propagate adder 104 adds together in carry-propagate addition the intermediate sum, the intermediate carry and the second correction value to output the multiplication result.

In the arithmetic unit having such a configuration, the intermediate product generator 101 adds the first correction value, −1, to the partial products, irrespective of occurrence or nonoccurrence of an overflow. The carry-propagate adder 104 adds, as the second correction value, 1 when an overflow does not occur and 0 when an overflow occurs.

Therefore, when an overflow does not occur, A×B−1+1 is calculated, in which the first correction value, which is once added, is canceled out by the second correction value, thereby appropriately obtaining the value of A×B as the operation result.

When an overflow occurs, an operation result is obtained as A×B−1, in which the overflow is corrected. Specifically, an operation as shown in FIG. 2, for example, is performed. (Referring to FIG. 2, the decimal point indicates that the MSB (most significant bit) on the left of the decimal point is the sign of the fixed-point number. Note that the following description uses binary representation unless otherwise specified.) Thus, if the multiplicand A and the multiplier B are both a negative value with the largest absolute value (1.000000), the partial product for the most significant digit is 1000000, and the partial product for the other digits is 0000000. While simply summing these partial products together overflows and results in a value in which only the sign bit is 1, when these partial products and the first correction value, −1 (=1.111111111111), are summed together by the carry-save adder 10b, an intermediate sum of 0.111111111111 and an intermediate carry of 0.000000000000 are obtained. Thus, there are obtained an intermediate sum and an intermediate carry corresponding to the largest positive value. When the intermediate sum, the intermediate carry and the second correction value (whose value is 0 when an overflow is detected by the overflow detection unit 102) are added together by the carry-propagate adder 104, there is obtained a multiplication result of 0.111111111111, i.e., a result corrected to the largest positive representable value.

As described above, a fixed first correction value (e.g., a correction value for a case where an overflow occurs) is added together in carry-save addition with the partial products irrespective of occurrence or nonoccurrence of an overflow, and a second correction value (e.g., a value that either cancels out the correction by the first correction value or gives no influence on the correction) is added in carry-propagate addition, or the like, according to whether an overflow will actually occur. Thus, a correction value, which would increase the delay time when added in carry-propagate addition, is added in carry-save addition in advance as the first correction value, after which the first correction value can be canceled out by the second correction value according to occurrence or nonoccurrence of an overflow. Therefore, it is possible to appropriately correct an overflow while keeping the total operation time short. Moreover, since the overflow detection may be performed at any timing such that the second correction value can be controlled, there is a large margin for the detection time, whereby it is possible to easily suppress an increase in the total operation time.

Particularly, where the first correction value is added in carry-save addition as described above, there is no such delay that would occur with carry propagation. Where the plurality of partial products and the first correction value are added in parallel by a carry-save adder tree, it is possible to easily keep the total operation time short by avoiding an increase in the number of logic stages for the addition of the first correction value. Where the second correction value is controlled to be either 1 or 0, it is only required to perform a two-numerical addition of the intermediate sum and the LSB, whereby it is possible to easily suppress an increase in the delay of circuit elements with respect to a case where the second correction value is not added. Moreover, since the first correction value is a constant, there is no significant increase in the circuit scale as compared with a case where the first correction value is not added.

In the example described above, the selector 103 is provided so that 0 or 1 is selectively output as the second correction value according to the overflow detection signal OD, for the purpose of illustration. In practice, however, the level of the overflow detection signal OD may be assigned to the second correction value of 0 or 1, wherein the overflow detection signal OD (as it is or the inverted version thereof) is directly input to the carry-propagate adder 104.

As the addition of the second correction value is performed in a later stage, there is provided a larger margin for the overflow detection timing. However, it may alternatively be added in the carry-save adder 101b as a carry-in if the detection can be performed in time. Moreover, the first correction value may alternatively be controlled to be either −1 or 0 according to the presence/absence of an overflow.

Embodiment 2

Embodiment 2 of the present invention is directed to an arithmetic unit for obtaining the sum of the product between the multiplicand A and the multiplier B and an addend X (i.e., a multiply-add operation). As compared with the arithmetic unit of Embodiment 1, the arithmetic unit of the present embodiment includes an intermediate product generator 201, instead of the intermediate product generator 101, as shown in FIG. 2. The intermediate product generator 201 is provided with a shifting unit 201c and a carry-save adder 201d, in addition to the partial product generator 101a and the carry-save adder 101b.

The shifting unit 201c performs a one-bit left shift on the first intermediate sum and the first intermediate carry, which are obtained by adding together all the partial products and the first correction value (−1) by the carry-save adder 101b, to output a shifted intermediate sum and a shifted intermediate carry, respectively. In the one-bit left shift operation, the LSB of the shifted intermediate sum is filled with 1, and the LSB of the shifted intermediate carry is filled with 0.

The carry-save adder 201d adds together the shifted intermediate sum, the shifted intermediate carry and the addend X (reducing three numbers to two) to output a second intermediate sum and a second intermediate carry.

The shifting unit 201c does not have to be a unit, such as a shift register, capable of storing and shifting data, but it is only required that the LSB of the output from the carry-save adder 101b is shifted by one bit to the higher position and input to the carry-save adder 201d, and that the LSB of the addend X is added with 1. With such a shift operation as described above, a multiplication of 7-bit fixed-point numbers represented as two's complements, for example, yields a 14-bit product. However, as long as a necessary precision is obtained, e.g., where the addend X has 13 bits, a shift operation as described above (bit extension) may not have to be performed. In a case where the number of bits of the addend is larger than that of the product, e.g., the addend X has 24 bits, the first intermediate sum and the first intermediate carry can be shifted to the left by a number of bits such that the decimal point position of the product is aligned with that of the addend X, with a portion of the first intermediate sum being filled with 1 starting from the LSB thereof according to the shift amount.

With the arithmetic unit having such a configuration, the first intermediate sum is shifted to the left and the LSB is filled with 1, which is equivalent to adding −1 to the bit-extended product.

Specifically, when an overflow occurs, a shit and fill operation is performed to add −1 to a 14-bit product, whereby there are obtained a shifted intermediate sum and a shifted intermediate carry (0.1111111111111 and 0.0000000000000) corresponding to the overflow-corrected multiplication result A×B−1, as shown in FIG. 4, for example. The shifted intermediate sum and the shifted intermediate carry are added with the addend X by the carry-save adder 201d to produce a second intermediate sum (y.y . . . ) and a second intermediate carry (z.z . . . ), which are added with the second correction value (which is 0 because an overflow is detected) by the carry-propagate adder 104, thus obtaining the multiply-add result X+A×B−1 of the addend X and the corrected multiplication result 0.111111111111 (largest positive value).

When an overflow does not occur, the second correction value is 1 as described above in Embodiment 1, thereby canceling out the correction by the first correction value, thus obtaining X+A×B−1+1, i.e., an ordinary multiply-add result X+A×B.

Also in Embodiment 2, the addition of the second correction value does not have to be performed by the carry-propagate adder 104, but it may be added as a carry-in of the carry-save adder 201d or any other suitable place such that the overflow detection can be performed in time and a correct operation result can be obtained. Moreover, the present invention is not limited to cases where each correction value is added/subtracted in an adder, but the addition/subtraction of the correction value may be realized with the use of a value used in a fill operation in the shifting unit or a combination of the use of such a value and an addition/subtraction operation. Nevertheless, in order to achieve a shorter delay and a smaller circuit scale, it is preferred that the number of stages of the parallel tree of adders and the number of additions performed for each digit are small.

Moreover, the addend X may not have to be added in the carry-save adder 201d, but may alternatively be added in the carry-save adder 101b while omitting the shifting unit 201c and the carry-save adder 201d. In such a case (and where the overflow detection can be performed in time as described above in Embodiment 1), the second correction value may also be added in the carry-save adder 101b.

While an arithmetic unit for obtaining a multiply-add result has been described above, it can also be used to obtain a product A×B or A×B−1 by, for example, inputting 0 as the addend X.

Embodiment 3

Figure 5:
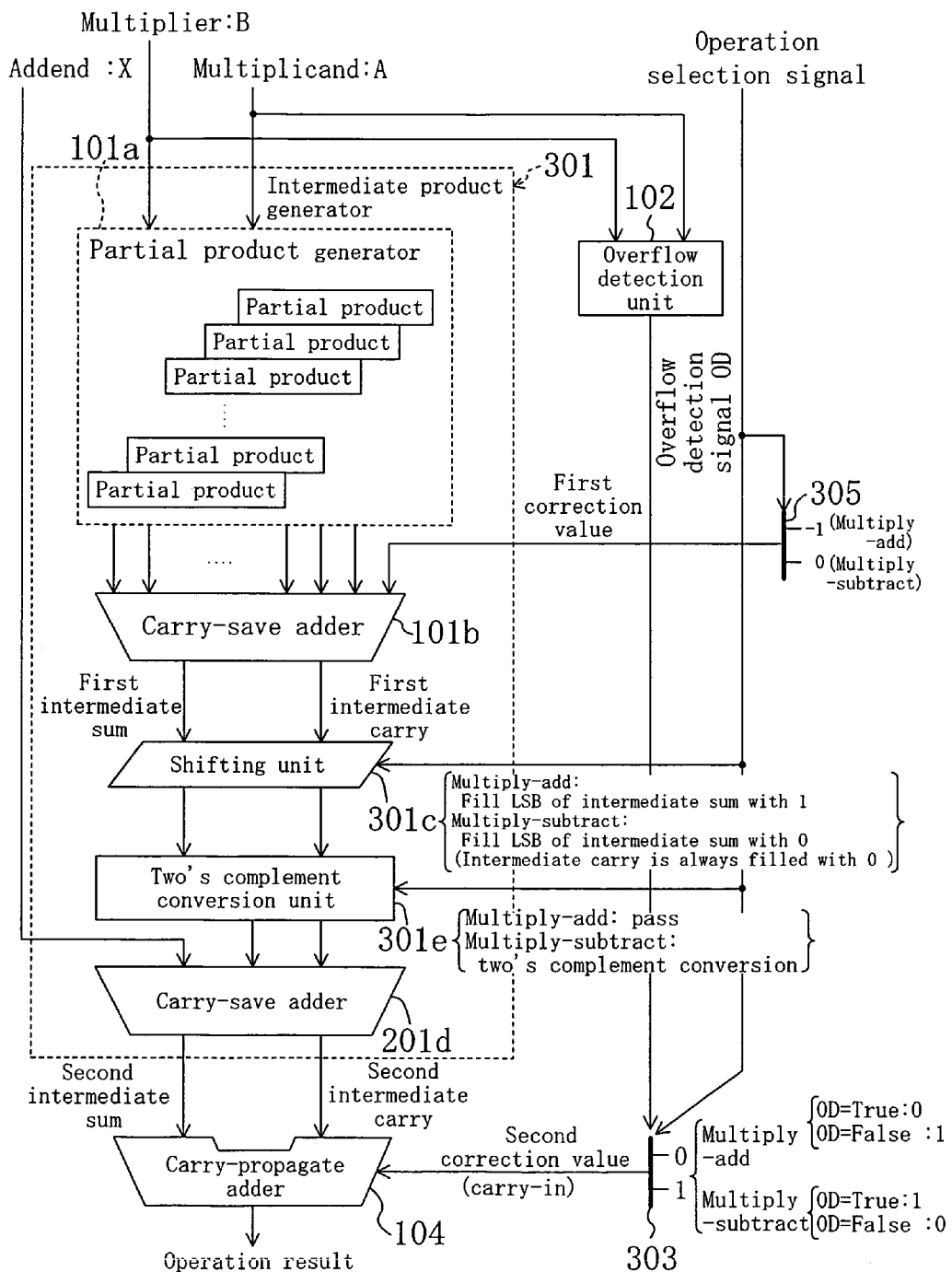
FIG. 5 is a block diagram showing a configuration of an arithmetic unit according to Embodiment 3.

Embodiment 3 of the present invention is directed to an arithmetic unit for selectively obtaining a sum (multiply-add result) or a difference (multiply-subtract result) of the product of the multiplicand A and the multiplier B and the addend X according to an instruction given as an operation selection signal. As compared with the arithmetic unit of Embodiment 2, the arithmetic unit of the present embodiment includes a selector 305, and also includes an intermediate product generator 301 and a selector 303, instead of the intermediate product generator 201 and the selector 103, respectively, as shown in FIG. 5.

The intermediate product generator 301 is provided with the partial product generator 101a and the carry-save adder 101b similar to those of Embodiments 1 and 2, the carry-save adder 201d similar to that of Embodiment 2, a shifting unit 301c, and a two's complement conversion unit 301e.

The selector 305, the shifting unit 301c, the two's complement conversion unit 301e and the selector 303 output values as follows. The selector 305 outputs, as the first correction value:
  −1 where a multiply-add operation is performed; or
  0 where a multiply-subtract operation is performed.
The shifting unit 301c performs a one-bit left shift operation on the first intermediate sum and the first intermediate carry output from the carry-save adder 101b, and
  fills the LSB of the intermediate sum with 1 for a multiply-add operation and 0 for a multiply-subtract operation; and
  fills the LSB of the intermediate carry always with 0.
The two's complement conversion unit 301e outputs
  the shifted intermediate sum and the shifted intermediate carry as they are for a multiply-add operation; and
  two's complements thereof for a multiply-subtract operation.

The selector 303 outputs, as the second correction value:
  0 when an overflow occurs or 1 when an overflow does not occur for a multiply-add operation; and
  1 when an overflow occurs or 0 when an overflow does not occur for a multiply-subtract operation.

The arithmetic unit having such a configuration performs the same operation as the arithmetic unit of Embodiment 2 in a case where a multiply-add operation is performed. Specifically, when an overflow occurs, it obtains an overflow-corrected, appropriate multiply-add result X+A×B−1 as shown in FIG. 6. Where there is no overflow, the correction by the first correction value is canceled out by the second correction value, thus obtaining an ordinary multiply-add result X+A×B−1+1=X+A×B.

Where a multiply-subtract operation is performed, the first correction value is 0, and the second correction value is 0 when an overflow does not occur and 1 when an overflow occurs, as described above.

In view of this, when an overflow does not occur, the carry-save adder 101b outputs a first intermediate sum and a first intermediate carry by adding together in carry-save addition all the partial products and 0 as the first correction value, and the first intermediate sum and the first intermediate carry are shifted to the left with the LSB being filled with 0 by the shifting unit 301c and then converted by the two's complement conversion unit 301e into two's complements, which are then added in carry-save addition with the addend X by the carry-save adder 201d. Thus, there are obtained a second intermediate sum and a second intermediate carry corresponding to a multiply-subtract result X−A×B, and they are added together in carry-propagate addition by the carry-propagate adder 104. If there is no overflow, the first intermediate sum, the first intermediate carry, and also values that are obtained by shifting and converting these values into two's complements will be appropriately-represented values. Thus, an appropriate multiply-subtract result X−A×B can be obtained when the second intermediate sum, the second intermediate carry and 0 (the second correction value) are added together in carry-propagate addition by the carry-propagate adder 104.

Where a multiply-subtract operation is performed and when an overflow occurs, the first intermediate sum is a value in which only the sign bit is 1 (1.000000000000), i.e., a value that is larger than the largest representable value by 1, as shown in FIG. 7, and this is true also for a value obtained by shifting this value to the left and filling the LSB with 0 (1.0000000000000 (S)). Where an overflow occurs, the first intermediate carry is 0.00000000000, and a value obtained by shifting this value is 0.000000000000 (C). Therefore, −A×B (the sum of the two's complements of (S) and (C)) is 1.0000000000000. This is a two's complement of a value that is larger than the largest positive value by 1 (i.e., the product A×B that is not overflow-corrected). Thus, even if the product A×B overflows, a value obtained by multiplying it with −1 (two's complement conversion) is a representable value. However, it is necessary that the overflow correction has been done before the multiplication by −1 (i.e., it is necessary that the multiplication result has been A×B−1, which is representable, by that time). Thus, 1 as the second correction value is added when the second intermediate sum and the intermediate carry are added together by the carry-propagate adder 104, whereby there is obtained a multiply-subtract result X−A×B+1=X−(A×B−1), being the sum of the addend X and a value obtained by multiplying the overflow-corrected multiplication result with −1 (1.0000000000001), i.e., an appropriately overflow-corrected multiply-subtract result.

As with the first intermediate sum, even if a value is not in a logical, legitimately representable form at an intermediate point during the arithmetic operation, an appropriate operation result will eventually be obtained.

Note that the addition of a correction value for the two's complement conversion may be performed in the carry-save adder 201d so as to eliminate or reduce an increase in the total operation time due to carry propagation, whereby it is possible to more reliably reduce the total operation time.

Moreover, the second correction value may be added by the carry-save adder 201d, as described above in Embodiment 2.

Furthermore, any appropriate combination of addends to be added in various units and a value used for the filling in the shift operation may be employed as long as the addition for the two's complement conversion and the overflow correction can be performed.

Embodiment 4

Figure 8:
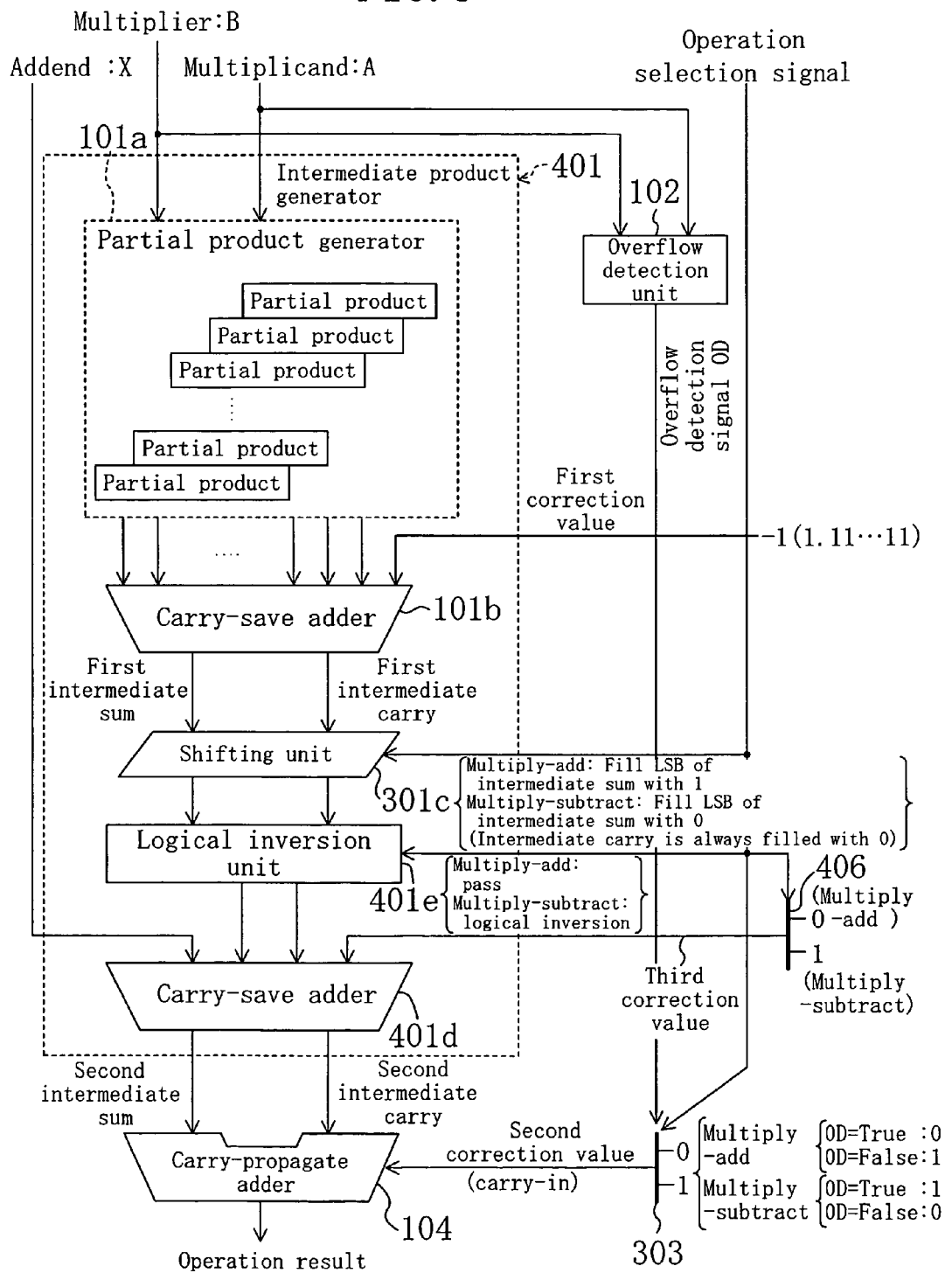
FIG. 8 is a block diagram showing a configuration of an arithmetic unit according to Embodiment 4.

Embodiment 4 of the present invention is directed to an alternative example of an arithmetic unit for performing a multiply-add operation or a multiply-subtract operation. As compared with the arithmetic unit of Embodiment 3, the arithmetic unit of the present embodiment includes an intermediate product generator 401, instead of the intermediate product generator 301, as shown in FIG. 8. The intermediate product generator 401 is provided with the partial product generator 101a and the carry-save adder 101b similar to those of Embodiments 1 and 2, the shifting unit 301c similar to that of Embodiment 3, a carry-save adder 401d, and a logical inversion unit 401e.

The selector 305 is not provided, and $-1$ is always input to the carry-save adder 101b of the intermediate product generator 401. A selector 406 is provided, and a third correction value according to an operation selection signal is input to the carry-save adder 401d.

More specifically, the logical inversion unit 401e outputs the shifted intermediate sum and the shifted intermediate carry from the shifting unit 301c as they are where a multiply-add operation is performed, and outputs values obtained by logically inverting the bit values where a multiply-subtract operation is performed.

In the carry-save adder 401d, the intermediate sum and the intermediate carry output from the logical inversion unit 401e, the addend X, and also the third correction value (0 where a multiply-add operation is performed and 1 where a multiply-subtract operation is performed) output from the selector 406 are added together in carry-save addition to reduce them to two numbers, i.e., a second intermediate sum and a second intermediate carry.

The arithmetic unit having such a configuration performs the same operation as the arithmetic units of Embodiments 2 and 3 in a case where a multiply-add operation is performed. Specifically, when an overflow occurs, the overflow is corrected as shown in FIG. 9 to obtain an appropriate multiply-add result $X+A \times B-1$. When an overflow does not occur, the correction by the first correction value is canceled out by the second correction value, thus obtaining an ordinary multiply-add result $X+A \times B-1+1=X+A \times B$.

Referring to FIG. 10, where a multiply-subtract operation is performed and when an overflow occurs, the first correction value is $-1$ as in a case where a multiply-add operation is performed. However, when the first intermediate sum and the first intermediate carry are shifted in the shifting unit 301c, the LSB (the next higher digit to the LSB of the intermediate sum for the intermediate carry) is filled with 0, and the bit values are logically inverted, after which 1 as the third correction value is added when the addend X is added by the carry-save adder 401d. (Note that 1 may be input directly to the carry-save adder 401d, for example, instead of filling the LSB of the intermediate sum with 0 and inverting the bit values.)

Thus, taking into consideration the subsequent shift and 0-filling operation, adding the first correction value ($-1$) is equivalent to adding $-10$. Therefore, the shifted intermediate sum (S) and the shifted intermediate carry (C) are an intermediate sum and an intermediate carry corresponding to $A \times B-10$.

$$S+C=A \times B-10$$

In the logical inversion unit 401e, there are obtained a logically inverted value S' and a logically inverted value C' obtained by logically inverting all the bits of the shifted intermediate sum and logically inverting bits of the shifted intermediate carry up to the next higher digit to the LSB of the shifted intermediate sum.

$$S'=-S-1$$

$$C'=-C-10$$

The carry-save adder 401d adds together the logically inverted values S' and C', the addend X and 1 as the third correction value to output a second intermediate sum and a second intermediate carry. Thus, $$\begin{aligned} X+S'+C'+1 &= X+(-S-1)+(-C-10)+1 \\ &= X-(S+C)-10 \\ &= X-(A \times B-10)-10 \\ &= X-A \times B \end{aligned}$$

Therefore, the second intermediate sum and the second intermediate carry are values corresponding to a multiply-subtract result $X-A \times B$, as in Embodiment 3.

Thus, when an overflow occurs, the second intermediate sum and the second intermediate carry and 1 as the second correction value are added together in carry-propagate addition by the carry-propagate adder 104, thereby obtaining an appropriately overflow-corrected multiply-subtract result $X-A \times B+1=X-(A \times B-1)$. Moreover, since it is not necessary to perform the carry-propagate addition for the two's complement conversion, it is possible to easily improve the operation speed.

When an overflow does not occur, the second correction value is 0, thus obtaining an ordinary multiply-subtract result $X-A \times B$.

As described above, where the third correction value being either 0 or 1 is used and the first correction value is fixed to $-1$ irrespective of whether the operation is a multiply-add operation or a multiply-subtract operation, it is possible to control whether or not to add $-1$ (where all bits are 1) by controlling a 1-bit value, whereby it is possible to easily reduce the circuit scale.

Note that as described above in Embodiment 2, the second correction value may be added by the carry-save adder 101b or the carry-save adder 401d, and the third correction value may be added by the carry-save adder 101b or the carry-propagate adder 104.

Embodiment 5

Figure 11:
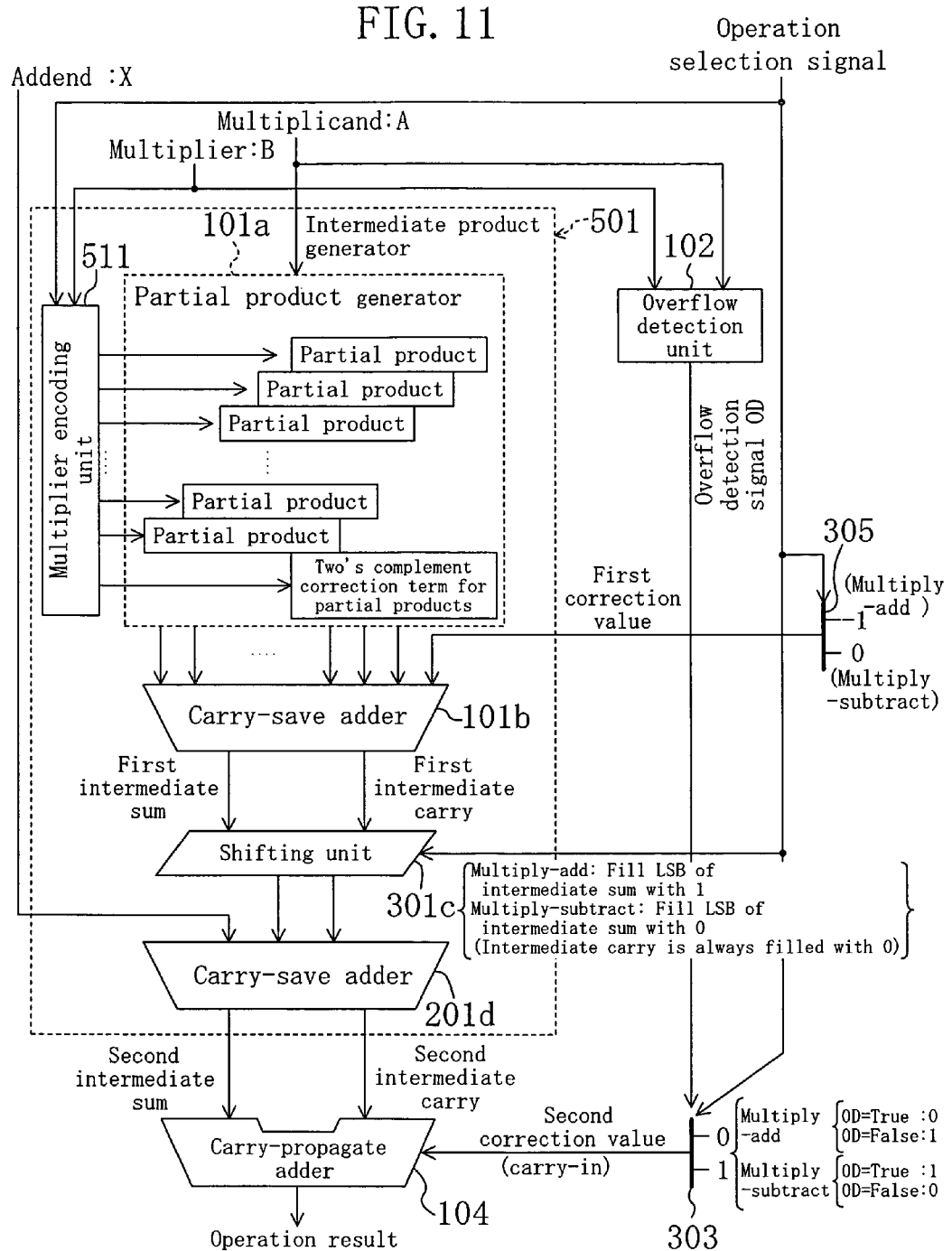
FIG. 11 is a block diagram showing a configuration of an arithmetic unit according to Embodiment 5.

Embodiment 5 of the present invention is directed to an arithmetic unit for performing a multiply-add operation or a multiply-subtract operation by using the Booth's algorithm. As compared with the arithmetic unit of Embodiment 3 (FIG. 5), the arithmetic unit of the present embodiment is provided with an intermediate product generator 501 including a multiplier encoding unit 511, instead of the intermediate product generator 301 including the two's complement conversion unit 301e, as shown in FIG. 11. The other configurations and the first and second correction values are the same as those of Embodiment 3.

According to the Radix-4 Booth's algorithm, for example, the multiplier encoding unit 511 outputs an encoding result corresponding to the multiplier B and a two's complement correction term for partial products when obtaining a multiply-add result, multiplier B multiplied by −1 and a two's complement correction term for partial products when obtaining a multiply-subtract result. Specifically, when obtaining a multiply-subtract result, the multiplier encoding unit 511 obtains a product between the multiplicand A and the multiplier B multiplied by −1, i.e., A×(−B), instead of multiplying the multiplication result by −1 by converting it into a two's complement as in Embodiment 3.

Where a multiply-add operation is performed with the arithmetic unit having such a configuration, a radix-4 Booth's encoding on the multiplier B (1000000) yields an encoding result of −1,0,0,0, as shown in FIG. 12, and a two's complement correction term for this is 1,0,0,0. Thus, the first intermediate sum and the first intermediate carry output from the carry-save adder 101b are the same as those of Embodiment 3 (FIG. 6), and the determination of whether or not to perform the correction according to occurrence or nonoccurrence of an overflow is performed similarly, thereby obtaining an appropriate multiply-add result X+A×B−1 or X+A×B. Thus, the overflow is corrected by adding −1 as the first correction value, and when an overflow does not occur, 1 as the second correction value is further added to cancel out the correction, thus obtaining an appropriate multiply-add result.

Where a multiply-subtract operation is performed, the encoding result is 1,0,0,0 (the two's complement of the encoding result where a multiply-add operation is performed), and the two's complement correction term is 0,0,0,0, as shown in FIG. 13. When an overflow does not occur, the first correction value and the second correction value are both 0, whereby a legitimate operation is performed to obtain an ordinary multiply-subtract result X−A×B. Moreover, when an overflow occurs, it is necessary that the overflow correction has been done before the multiplication by −1 (i.e., it is necessary that the multiplication result has been A×B−1, which is representable, by that time), as described above in Embodiment 3. Therefore, 1 as the second correction value is added when the second intermediate sum and the intermediate carry are added together by the carry-propagate adder 104, thereby obtaining a multiply-subtract result X−A×B+1=X−(A×B−1) between the addend X and overflow-corrected multiplication result multiplied by −1 (1.0000000000001), i.e., an appropriately overflow-corrected multiply-subtract result.

Embodiment 6

Figure 14:
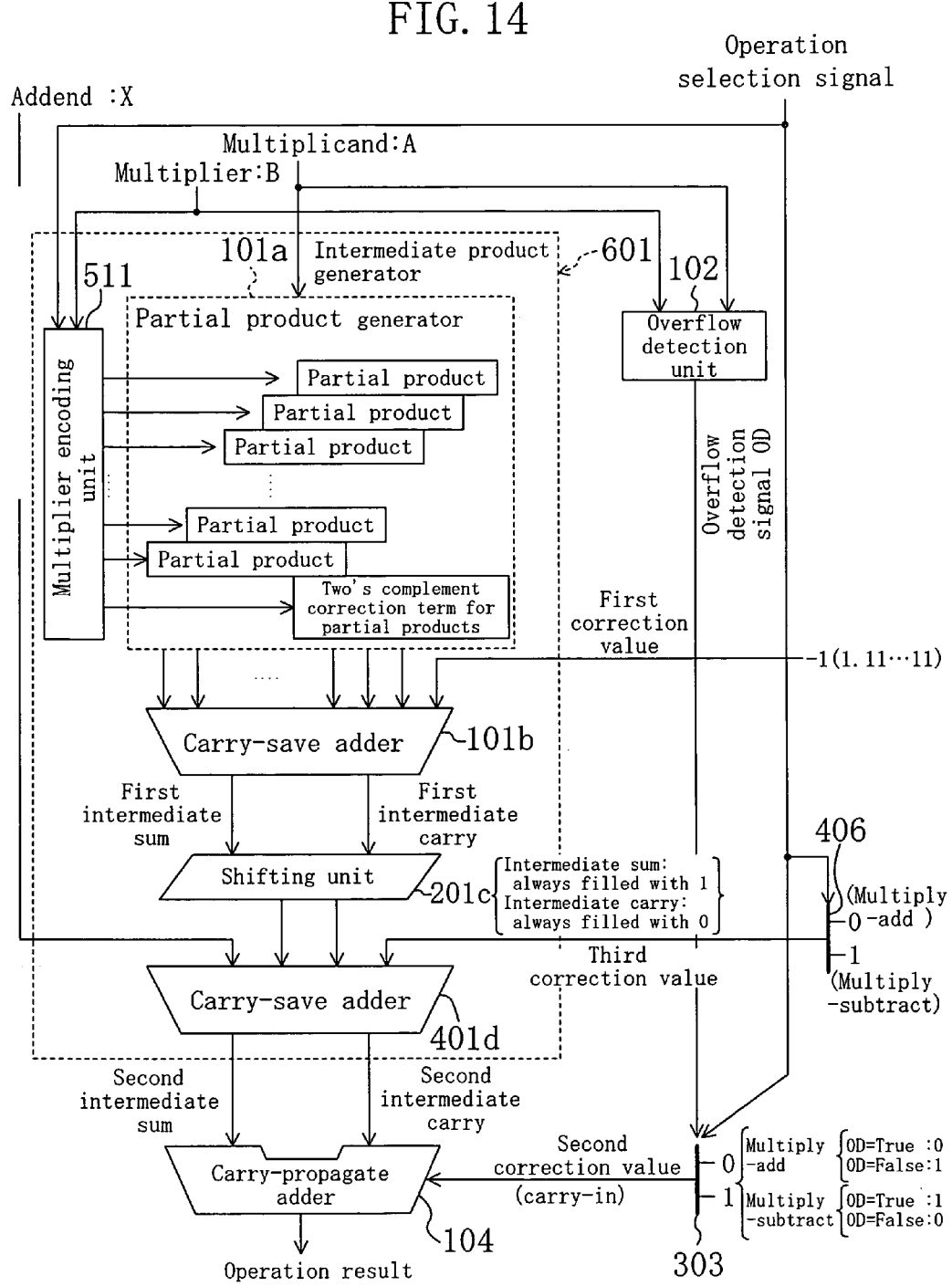
FIG. 14 is a block diagram showing a configuration of an arithmetic unit according to Embodiment 6.
Figure 17:
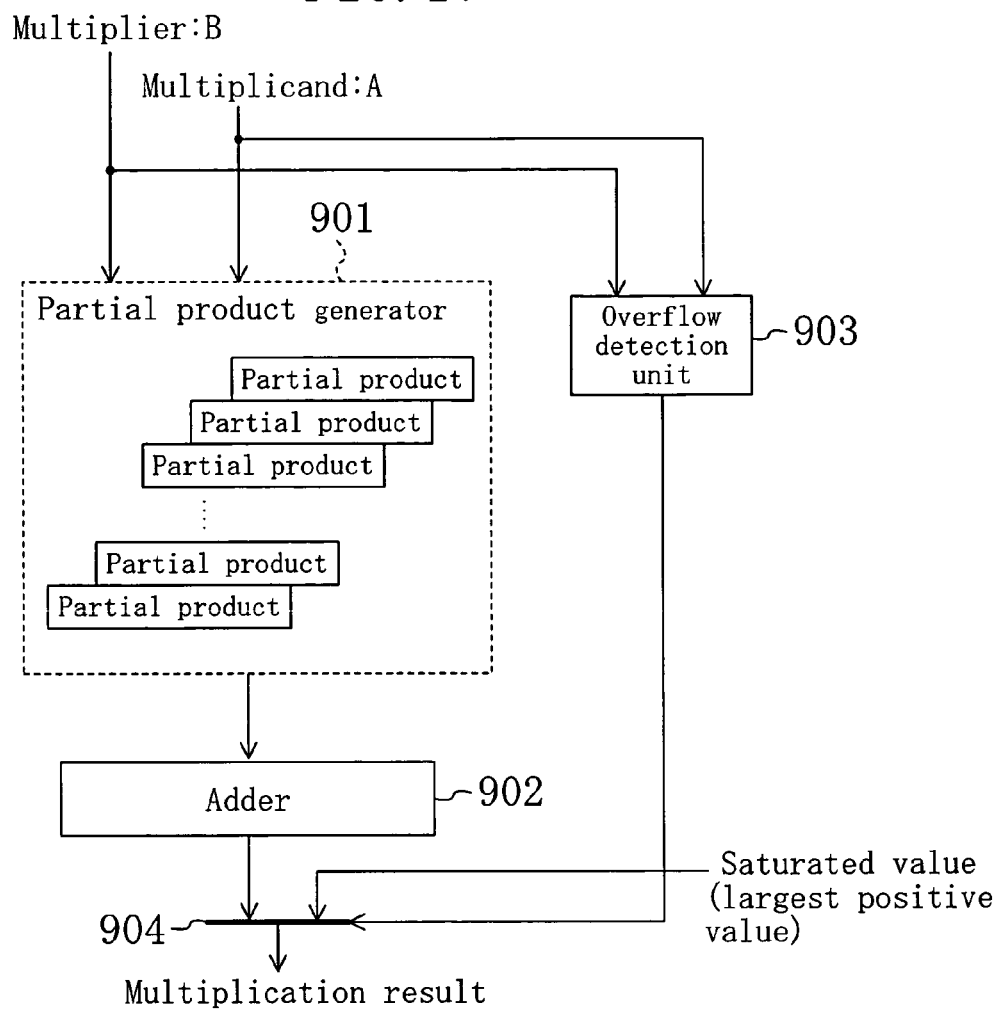
FIG. 17 is a block diagram showing a configuration of a conventional arithmetic unit.

Embodiment 6 of the present invention is directed to an alternative example of an arithmetic unit using the Booth's algorithm. As compared with the arithmetic unit of Embodiment 5, the arithmetic unit of the present embodiment is provided with an intermediate product generator 601, instead of the intermediate product generator 501, as shown in FIG. 14. The selector 305 is not provided, and −1 is always input to the intermediate product generator 601 as the first correction value. The selector 406 similar to that of Embodiment 4 (FIG. 8) is provided, and a third correction value according to whether the operation is a multiply-add operation or a multiply-subtract operation is input to the carry-save adder 401d of the intermediate product generator 601.

The intermediate product generator 601 includes the shifting unit 201c and the carry-save adder 401d, instead of the shifting unit 301c and the carry-save adder 201d of the intermediate product generator 501 of Embodiment 5. In a one-bit left shift operation, the shifting unit 201c always fills the intermediate sum with 1 and the intermediate carry with 0 irrespective of whether the operation is a multiply-add operation or a multiply-subtract operation. The carry-save adder 401d is the same as that of Embodiment 4, and adds together in carry-save addition the shifted intermediate sum and the shifted intermediate carry, which have been shifted by the shifting unit 201c, the addend X and the third correction value.

For a multiply-add operation, the arithmetic unit having such a configuration performs the same operation as that of the arithmetic unit of Embodiment 5, as shown in FIG. 15. Specifically, the first correction value is −1, the value with which a bit or bits are filled in a left shift operation is 1 for the intermediate sum and 0 for the intermediate carry, the third correction value is 0, and the second correction value is 0 or 1 according to occurrence or nonoccurrence of an overflow, thus obtaining an appropriate multiply-add result X+A×B−1 or X+A×B.

For a multiply-subtract operation, an operation as shown in FIG. 16 is performed. In Embodiment 5, the first correction value is set to 0 for a multiply-subtract operation. In contrast, in Embodiment 6, irrespective of whether the operation is a multiply-add operation or a multiply-subtract operation, −1 is added as the first correction value, and the intermediate sum is shifted to the left and filled with 1. Where a multiply-subtract operation is performed, 1 as the third correction value is added in the addition operation by the carry-save adder 401d, thereby canceling out the first correction value. Thus, the second intermediate sum and the second intermediate carry output from the carry-save adder 401d are the same as those of Embodiment 5, and the addition of the second correction value according to occurrence or nonoccurrence of an overflow is similarly performed, thus obtaining an appropriate multiply-subtract result X−A×B or X−(A×B−1).

By using the third correction value being 0 or 1, and fixing the first correction value to −1 irrespective of whether the operation is a multiply-add operation or a multiply-subtract operation, as described above, it is only necessary to control a 1-bit value as in Embodiment 4, whereby it is possible to easily reduce the circuit scale.

Even if the product overflows, the product multiplied by −1 is regularly representable in two's complement representation, but when −1 as the first correction value is added as described above, it still falls out of the representable range as is the first intermediate sum of FIG. 16. However, when shifting the value to the left and filling the LSB thereof with 1, and then adding thereto 1 as the third correction value, it again becomes a representable value, whereby it is possible to obtain an appropriate multiply-subtract result. Thus, as described above in Embodiment 3, even if a value is not in a logical, regularly representable form at an intermediate point during the arithmetic operation, there is no problem as long as an appropriate operation result is eventually obtained.

Note that each element of an example or an alternative example described in an embodiment above may be applicable to other embodiments as long as such an application is logically possible. For example, as described above for the selector 103 in Embodiment 1, the overflow detection signal OD, the operation selection signal, or modified signals thereof (e.g., a logically inverted signal or an XORed signal thereof) may be input to the carry-propagate adder 104, etc., as a carry-in or a value with which a bit or bits are filled in a left shift operation. Moreover, in Embodiment 3, etc., 0 may be input as the addend X as described above in Embodiment 2, whereby it is possible to obtain a product (A×B or A×B−1) by eliminating the addition with the addend X, in addition to obtaining a multiply-add result or a multiply-subtract result.

As described above, an arithmetic unit of the present invention, with which an overflow of a multiplication result is appropriately corrected and it is possible to easily and reliably improve the speed of arithmetic operations including multiplication, is useful as, for example, an arithmetic unit for performing arithmetic operations such as a multiplication operation, a multiply-add operation and a multiply-subtract operation on fixed-point numbers.

What is claimed is:

1. An arithmetic unit for performing arithmetic operations including a multiplication operation of a multiplicand A and a multiplier B, each being a fixed-point number represented as a two's complement, the arithmetic unit comprising:
    an overflow detection unit for detecting occurrence of an overflow in a product of the multiplicand A and the multiplier B;
    an intermediate product generator for obtaining an intermediate sum and an intermediate carry by carry-save addition of a plurality of partial products of the multiplicand A and the multiplier B and a predetermined first correction value; and
    a carry-propagate adder for obtaining an operation result by carry-propagate addition of the intermediate sum and the intermediate carry,
    wherein a predetermined second correction value according to a detection result of the overflow detection unit is added either in the intermediate product generator or the carry-propagate adder.

2. The arithmetic unit of claim 1, wherein the overflow detection unit detects an overflow when the multiplicand A and the multiplier B are both a negative value with a largest absolute value.

3. The arithmetic unit of claim 1, wherein:
    the first correction value is −1; and
    the second correction value is 0 when an overflow occurs and 1 when an overflow does not occur.

4. The arithmetic unit of claim 1, wherein the intermediate product generator is configured so that the plurality of partial products and the first correction value are added in parallel by a carry-save addition tree.

5. The arithmetic unit of claim 1, wherein:
    the intermediate product generator obtains an intermediate sum and an intermediate carry by carry-save addition of the plurality of partial products of the multiplicand A and the multiplier B, the first correction value and an addend X represented as a two's complement; and
    the carry-propagate adder obtains a sum of the addend X and the product of the multiplicand A and the multiplier B (X+A×B).

6. The arithmetic unit of claim 5, wherein:
    the first correction value is −1; and
    the second correction value is 0 when an overflow occurs and 1 when an overflow does not occur.

7. The arithmetic unit of claim 6, wherein the intermediate product generator obtains:
    an intermediate sum and an intermediate carry by carry-save addition of a value obtained by shifting a preliminary intermediate sum by one bit to the left and inserting 1 in a least significant bit thereof, a value obtained by shifting a preliminary intermediate carry by one bit to the left and inserting 0 in a least significant bit thereof and the addend X, wherein the preliminary intermediate sum and the preliminary intermediate carry are obtained by carry-save addition of the plurality of partial products of the multiplicand A and the multiplier B and the first correction value; or
    an intermediate sum and an intermediate carry by carry-save addition of the plurality of partial products of the multiplicand A and the multiplier B, the first correction value and the addend X.

8. The arithmetic unit of claim 1, wherein:
    when obtaining a multiply-add result, the intermediate product generator obtains an intermediate sum and an intermediate carry by carry-save addition of the plurality of partial products of the multiplicand A and the multiplier B, the first correction value and an addend X represented as a two's complement;
    when obtaining a multiply-subtract result, the intermediate product generator obtains an intermediate sum and an intermediate carry by carry-save addition of a value obtained by converting a preliminary intermediate sum into a two's complement, a value obtained by converting a preliminary intermediate carry into a two's complement and the addend X, wherein the preliminary intermediate sum and the preliminary intermediate carry are obtained by carry-save addition of the plurality of partial products of the multiplicand A and the multiplier B and the first correction value; and
    the carry-propagate adder obtains a sum or a difference of the addend X and the product of the multiplicand A and the multiplier B (X+A×B or X−A×B).

9. The arithmetic unit of claim 8, wherein:
    when obtaining a multiply-add result, the first correction value is −1, and the second correction value is 0 when an overflow occurs and 1 when an overflow does not occur; and
    when obtaining a multiply-subtract result, the first correction value is 0, and the second correction value is 1 when an overflow occurs and 0 when an overflow does not occur.

10. The arithmetic unit of claim 9, wherein:
    when obtaining a multiply-add result, the intermediate product generator obtains an intermediate sum and an intermediate carry by carry-save addition of a value obtained by shifting a preliminary intermediate sum by one bit to the left and inserting 1 in a least significant bit thereof, a value obtained by shifting a preliminary intermediate carry by one bit to the left and inserting 0 in a least significant bit thereof and the addend X, wherein the preliminary intermediate sum and the preliminary intermediate carry are obtained by carry-save addition of the plurality of partial products of the multiplicand A and the multiplier B and the first correction value; and when obtaining a multiply-subtract result, the intermediate product generator obtains an intermediate sum and an intermediate carry by carry-save addition of a value obtained by shifting a preliminary intermediate sum by one bit to the left, inserting 0 in a least significant bit thereof and converting the shifted preliminary intermediate sum into a two's complement, a value obtained by shifting a preliminary intermediate carry by one bit to the left, inserting 0 in a least significant bit thereof and converting the shifted preliminary intermediate carry into a two's complement and the addend X, wherein the preliminary intermediate sum and the preliminary intermediate carry are obtained by carry-save addition of the plurality of partial products of the multiplicand A and the multiplier B and the first correction value.

11. The arithmetic unit of claim 1, wherein:

when obtaining a multiply-add result, the intermediate product generator obtains an intermediate sum and an intermediate carry by carry-save addition of the plurality of partial products of the multiplicand A and the multiplier B, the first correction value and an addend X represented as a two's complement;

when obtaining a multiply-subtract result, the intermediate product generator obtains an intermediate sum and an intermediate carry by carry-save addition of a value obtained by inverting bit values of a preliminary intermediate sum, a value obtained by inverting bit values of a preliminary intermediate carry and an addend X represented as a two's complement, wherein the preliminary intermediate sum and the preliminary intermediate carry are obtained by carry-save addition of the plurality of partial products of the multiplicand A and the multiplier B and the first correction value;

a predetermined third correction value is added either in the intermediate product generator or the carry-propagate adder; and the carry-propagate adder obtains a sum or a difference of the addend X and the product of the multiplicand A and the multiplier B (X+A×B or X−A×B).

12. The arithmetic unit of claim 11, wherein:

the first correction value is −1;

when obtaining a multiply-add result, the second correction value is 0 when an overflow occurs and 1 when an overflow does not occur;

when obtaining a multiply-subtract result, the second correction value is 1 when an overflow occurs and 0 when an overflow does not occur;

when obtaining a multiply-add result, the third correction value is 0; and when obtaining a multiply-subtract result, the third correction value 1.

13. The arithmetic unit of claim 12, wherein:

when obtaining a multiply-add result, the intermediate product generator obtains an intermediate sum and an intermediate carry by adding together in carry-save addition a value obtained by shifting a preliminary intermediate sum by one bit to the left and inserting 1 in a least significant bit thereof, a value obtained by shifting a preliminary intermediate carry by one bit to the left and inserting 0 in a least significant bit thereof and the addend X, wherein the preliminary intermediate sum and the preliminary intermediate carry are obtained by carry-save addition of the plurality of partial products of the multiplicand A and the multiplier B and the first correction value;

when obtaining a multiply-subtract result, the intermediate product generator obtains an intermediate sum and an intermediate carry by carry-save addition of a value obtained by shifting a preliminary intermediate sum by one bit to the left, inserting 0 in a least significant bit thereof and inverting bit values thereof, a value obtained by shifting a preliminary intermediate carry by one bit to the left, inserting 0 in a least significant bit thereof and inverting bit values thereof and the addend X, wherein the preliminary intermediate sum and the preliminary intermediate carry are obtained by carry-save addition of the plurality of partial products of the multiplicand A and the multiplier B and the first correction value.

14. The arithmetic unit of claim 1, further comprising a multiplier encoding unit for outputting a multiplier D and a two's complement correction term E for the multiplier D, wherein the multiplier D is a result of encoding the multiplier B according to a Booth's algorithm when obtaining a multiply-add result and is a result of encoding a value obtained by multiplying the multiplier B and −1 according to a Booth's algorithm when obtaining a multiply-subtract result, wherein:

the intermediate product generator obtains an intermediate sum and an intermediate carry by carry-save addition of a plurality of partial products of the multiplicand A and the multiplier D, the two's complement correction term E and the first correction value; and the carry-propagate adder obtains a sum or a difference of the addend X and the product of the multiplicand A and the multiplier B (X+A×B or X−A×B).

15. The arithmetic unit of claim 14, wherein when obtaining a multiply-add result, the first correction value is −1, and the second correction value is 0 when an overflow occurs and 1 when an overflow does not occur; and when obtaining a multiply-subtract result, the first correction value is 0, and the second correction value is 1 when an overflow occurs and 0 when an overflow does not occur.

16. The arithmetic unit of claim 15, wherein:

when obtaining a multiply-add result, the intermediate product generator obtains an intermediate sum and an intermediate carry by carry-save addition of a value obtained by shifting a preliminary intermediate sum by one bit to the left and inserting 1 in a least significant bit thereof, a value obtained by shifting a preliminary intermediate carry by one bit to the left and inserting 0 in a least significant bit thereof and the addend X, wherein the preliminary intermediate sum and the preliminary intermediate carry are obtained by carry-save addition of the plurality of partial products of the multiplicand A and the multiplier D, the two's complement correction term E and the first correction value;

when obtaining a multiply-subtract result, the intermediate product generator obtains an intermediate sum and an intermediate carry by carry-save addition of a value obtained by shifting a preliminary intermediate sum by one bit to the left and inserting 0 in a least significant bit thereof, a value obtained by shifting a preliminary intermediate carry by one bit to the left and inserting 0 in a least significant bit thereof and the addend X, wherein the preliminary intermediate sum and the preliminary intermediate carry are obtained by carry-save addition of the plurality of partial products of the multiplicand A and the multiplier D, the two's complement correction term E and the first correction value.

17. The arithmetic unit of claim 14, wherein:

a predetermined third correction value is added either in the intermediate product generator or the carry-propagate adder;

the first correction value is −1;

when obtaining a multiply-add result, the second correction value is 0 when an overflow occurs and 1 when an overflow does not occur;

when obtaining a multiply-subtract result, the second correction value is 1 when an overflow occurs and 0 when an overflow does not occur;

when obtaining a multiply-add result, the third correction value is 0; and when obtaining a multiply-subtract result, the third correction value is 1.

18. The arithmetic unit of claim 17, wherein the intermediate product generator obtains an intermediate sum and an intermediate carry by carry-save addition of a first value obtained by shifting a preliminary intermediate sum by one bit to the left and inserting 1 in a least significant bit thereof, a second value obtained by shifting a preliminary intermediate carry by one bit to the left and inserting 0 in a least significant bit thereof and the addend X, or by carry-save addition of the first value, the second value, the addend X and the third correction value, wherein the preliminary intermediate sum and the preliminary intermediate carry are obtained by carry-save addition of the plurality of partial products of the multiplicand A and the multiplier D, the two's complement correction term E and the first correction value.

* * * * *